United States Patent
Seong et al.

(10) Patent No.: US 9,667,081 B2
(45) Date of Patent: May 30, 2017

(54) BATTERY CHARGING SYSTEM USING CHARGER AND DRIVING CONTROL METHOD OF THE CHARGER THEREOF

(71) Applicant: Hyundai Motor Company, Seoul (KR)

(72) Inventors: Hyun Wook Seong, Gyeonggi-do (KR); Mu Shin Kwak, Gyeonggi-do (KR); Shin Hye Chun, Jeollanam-do (KR); Hui Sung Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 14/558,019

(22) Filed: Dec. 2, 2014

(65) Prior Publication Data
US 2015/0349560 A1    Dec. 3, 2015

(30) Foreign Application Priority Data
May 29, 2014  (KR) .................. 10-2014-0065034

(51) Int. Cl.
| | |
|---|---|
| H02J 7/00 | (2006.01) |
| H02J 7/02 | (2016.01) |
| H02M 1/42 | (2007.01) |
| H02M 1/36 | (2007.01) |
| H02J 7/04 | (2006.01) |
| B60L 3/00 | (2006.01) |
| B60L 11/18 | (2006.01) |
| H02M 3/335 | (2006.01) |
| H02M 1/00 | (2006.01) |

(52) U.S. Cl.
CPC .............. *H02J 7/0052* (2013.01); *B60L 3/00* (2013.01); *B60L 11/1851* (2013.01); *H02J 7/02* (2013.01); *H02J 7/04* (2013.01); *H02M 1/36* (2013.01); *H02M 1/42* (2013.01); *B60L 2240/547* (2013.01); *B60L 2240/80* (2013.01); *H02M 1/4208* (2013.01); *H02M 3/33523* (2013.01); *H02M 2001/007* (2013.01); *H02M 2001/0096* (2013.01); *Y02B 70/126* (2013.01)

(58) Field of Classification Search
CPC ............ H02J 7/0052; H02J 7/02; H02M 1/36; H02M 1/42; H02M 1/4208; H02M 2001/007; H02M 2001/0096; H02M 3/33523; Y02B 70/126
See application file for complete search history.

(56) References Cited

U.S. PATENT DOCUMENTS

| | | | | |
|---|---|---|---|---|
| 7,652,450 B2 * | 1/2010 | Aradachi | .............. | H02J 7/0072 320/106 |
| 2013/0193922 A1 * | 8/2013 | Park | .................. | H02J 7/02 320/109 |

FOREIGN PATENT DOCUMENTS

| | | |
|---|---|---|
| JP | 2003-174704 A | 6/2003 |
| JP | 2012-183860 | 9/2012 |
| JP | 2013-158240 A | 8/2013 |

(Continued)

*Primary Examiner* — Vuthe Siek
(74) *Attorney, Agent, or Firm* — Mintz Levin Cohn Ferris Glovsky and Popeo, P.C.; Peter F. Corless

(57) ABSTRACT

A battery charging system using a charger and a driving control method of the charger thereof are provided which increase a driving time of the charger when an instantaneous power failure of charger input voltage occurs in the battery charging system. Thus, a sufficient time is secured for obtaining and processing more precise information regarding a driving state of the charger and the capacity of a capacitor is decreased compared to the related art.

4 Claims, 5 Drawing Sheets

(56) References Cited

FOREIGN PATENT DOCUMENTS

| KR | 10-2012-0007663 | 1/2012 |
| KR | 10-2012-0076537 | 7/2012 |
| KR | 10-2013-0032985 | 4/2013 |
| KR | 10-2013-0081973 | 7/2013 |
| KR | 10-1297507 | 8/2013 |

* cited by examiner

※ VDC_min : Minimum voltage at driving of OBC is possible
Iref_on : Charger output current when AC input is on
Iref_off : Charger output current when AC input is off

| —— Related art |
| —— Present invention |
| ▬ Overlapping section |

BATTERY CHARGING SYSTEM USING CHARGER AND DRIVING CONTROL METHOD OF THE CHARGER THEREOF

CROSS-REFERENCE TO RELATED APPLICATION

This application claims under 35 U.S.C. §119(a) the benefit of Korean Patent Application No. 10-2014-0065034 filed May 29, 2014, the entire contents of which are incorporated herein by reference.

BACKGROUND (a) Technical Field

The present invention relates to a battery charging system using a charger and a driving control method of the charger thereof, which increases the driving time of the charger during a power failure of the charger mounted within a vehicle.

(b) Background Art

As air pollution caused by exhaust gas of vehicles increases due to the development of automobile industries, interest in reduction of the exhaust gas has increased. Thus, studies on environmentally-friendly vehicles capable of reducing exhaust gas have been actively conducted. The environmentally-friendly vehicles include a hybrid vehicle, a plug-in hybrid vehicle, an electric vehicle, a fuel cell vehicle, and the like. Among these vehicles, the plug-in hybrid vehicle and the electric vehicle perform battery charging using a power source. Accordingly, an on board charger (OBC) is mounted within the vehicle.

FIG. 1 is an exemplary configuration diagram illustrating a battery charging system using an OBC according to a related art. FIG. 2 is an exemplary graph illustrating states of factors (e.g., output voltage, output current, output power, and the like) related to driving of the charger when an instantaneous power failure of charger input power occurs in the battery charging system. In particular, the graph (a) in FIG. 2 illustrates a state of alternating current (AC) input voltage VIN input to the OBC and graph (b) illustrates a state of output voltage Vo of the OBC. In addition, graph (c) illustrates a state of output voltage VDC of a power factor corrector (PFC) of the OBC, graph (d) illustrates a state of output current Io of the OBC, graph (e) illustrates a state of output power Po of the OBC, and graph (f) illustrates a state of effective duty Deff for controlling the output voltage of a DC-DC converter.

The related art battery charging system using the OBC is used to charge a high voltage battery used as a main battery of an environmentally-friendly vehicle. As shown in FIG. 1, the battery charging system includes a PFC converter 1, a direct current-direct current (DC-DC) converter 2, a controller 3, a first capacitor 4, and a second capacitor 5.

The PFC converter 1 is connected to an output terminal of an AC power unit 6 to convert AC input voltage VIN input from the AC power unit 6 into DC voltage VDC and compensate for the power factor of power. The DC-DC converter 2 is connected between an output terminal of the PFC converter 1 and an input terminal of a high voltage battery 7 to receive DC voltage VDC output from the PFC converter 1 to convert the DC voltage VDC into voltage for charging of the high voltage battery 7. In particular, an insulated DC-DC converter using a full-bridge or half-bridge type switching circuit may be applied to the DC-DC converter 2.

The first and second capacitors 4 and 5 smooth outputs of the PFC converter 1 and the DC-DC converter, respectively. The graphs of the output voltage VDC of the PFC converter 1 and the output voltage Vo of the DC-DC converter 2 (or the OBC), shown in FIG. 2, illustrate voltages smoothed through the use of the first and second capacitors 4 and 5. The controller 3 is configured to receive the AC voltage VIN output from the AC power unit 6 and the output voltage VDC of the PFC converter 1 to operate the PFC converter 1, and receive the output voltage Vo of the DC-DC converter 2 to operate the DC-DC converter 2. In particular, the PFC converter 1 is configured to receive input current input from the controller 3, and the DC-DC converter 2 is configured to receive output current input from the controller 3.

The related art battery charging system configured as described above uses a control technique of maintaining the existing state when the supply of the AC input voltage to the OBC is stopped due to an instantaneous power interruption or power failure, (i.e., a control technique of maintaining a driving state of the OBC to be identical to that before the supply of the AC input voltage VIN of the OBC is stopped). Specifically, in the OBC shown in FIG. 1, the output voltage VDC of the PFC converter 1 is used as an input voltage of the DC-DC converter 2. Thus, the output voltage VDC becomes an important factor for determining a driving time of the charger.

In the battery charging system, the minimum voltage VDC_min capable of continuously driving the OBC should be maintained to a few microseconds (µs) or greater to prevent malfunction and damage of the OBC by detecting and storing the driving state of the OBC when the input of the charger is stopped. When the power supply is stopped due to the AC input voltage VIN of the OBC being turned off, this is the same as no input voltage VIN of the PFC converter 1. Hence, the PFC converter 1 is in an uncontrollable state due to loss of input, and the controller 3 may not be able to adjust the output voltage VDC of the PFC converter 1.

In other words, in the related art battery charging system, the charging operation of the OBC is controlled identically to the existing state (state in which the AC input voltage is on) even though the AC input voltage VIN is off, and therefore, the voltage of the first capacitor 4 is suddenly decreased. As a result, the output voltage VDC of the PFC converter 1 decreases to less than the minimum voltage VDC_min. Therefore, a minimum driving time for detecting and dealing with the driving state of the charger may not be possible. When the OBC mounted in the vehicle does not receive the input voltage VIN due to an instantaneous power failure or the like, the driving state of the OBC is not precisely detected. As a result, a malfunction of the OBC may be caused, and therefore, the vehicle may be in a dangerous situation.

Accordingly, in the related art battery charging system, a method of increasing energy stored in the first capacitor 4 by increasing the capacity of the first capacitor 4 is used to delay the time at which the output voltage VDC of the PFC converter 1 reaches the minimum voltage VDC_min and to secure the minimum driving time of the OBC when the supply of the AC input voltage VIN is stopped. However, this causes an increase in cost.

SUMMARY

The present invention provides a battery charging system using a charger and a driving control method of the charger thereof, which increase a driving time of the charger when an instantaneous power failure of charger input voltage occurs in the battery charging system, so that it may be possible to secure a sufficient time for obtaining and processing more precise information regarding a driving state of the charger and to decrease the capacity of a capacitor compared to the related art.

In one aspect, the present invention provides a battery charging system using a charger that may include: an on board charger (OBC) configured to include a power factor corrector (PFC) converter connectable to an output terminal of an AC power unit, and a DC-DC converter connected between the PFC converter and a high voltage battery; and a controller configured to determine the presence of generation of charger input voltage VIN output from the AC power unit and determine output current Ioref or output power Poref of the DC-DC converter, based on the determination.

In an exemplary embodiment, when the charger input voltage VIN is not generated, the controller may be configured to determine the output current of the DC-DC converter as a current less than the output current in the generation of the charger input voltage VIN. In another exemplary embodiment, when the charger input voltage VIN is not generated, the controller may be configured to limit the output power of the DC-DC converter to a power less than the output power in the generation of the charger input voltage VIN.

In another aspect, the present invention provides a driving control method of a charger of a battery charging system, which includes a PFC converter connectable to an output terminal of an AC power unit, and a DC-DC converter connected between the PFC converter and a high voltage battery, the driving control method may include: a first process of determining, by a controller, the presence of generation of charger input voltage VIN output from the AC power unit; and a second process of securing, by the controller, a minimum driving time of the charger by determining output current or output power of the DC-DC converter when the charger input voltage VIN is not generated as current or power decreased compared to when the charger input voltage VIN is generated. In an exemplary embodiment, in the second process, the output current of the DC-DC converter may be limited to a current less than the output current when the charger input voltage VIN is generated.

As described above, the battery charging system using the according to the present invention has advantages as follows.

First, the driving time of the OBC may be increased by limiting the charger output current or charger output power when an instantaneous power failure or the like occurs, to allow the charger to be more stably driven even in the instantaneous power failure.

Second, the initial sequence according to the re-operation of the charger may not be repeated due to an increase in the driving time of the OBC when an instantaneous power failure or the like occurs, and thus it may be possible to prevent an increase in efficiency that may occur due to the initial time according to the re-operation of the charger.

Third, the minimum driving time for a stable operation of the OBC in the instantaneous power failure may be secured, and thus it may be unnecessary to increase the capacity of the first capacitor connected to the output terminal of the PFC converter to form a high output voltage VDC of the PFC converter. Accordingly, it may be possible to design the capacity of the capacitor to be smaller than that of the related art, thereby achieving cost reduction.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
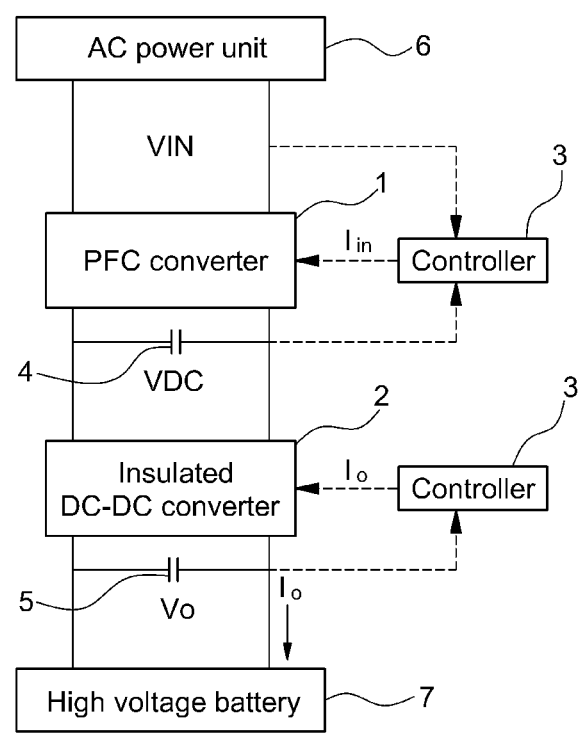
FIG. 1 is an exemplary configuration diagram illustrating a conventional battery charging system using an on board charger (OBC) according to the related art.
Figure 2:
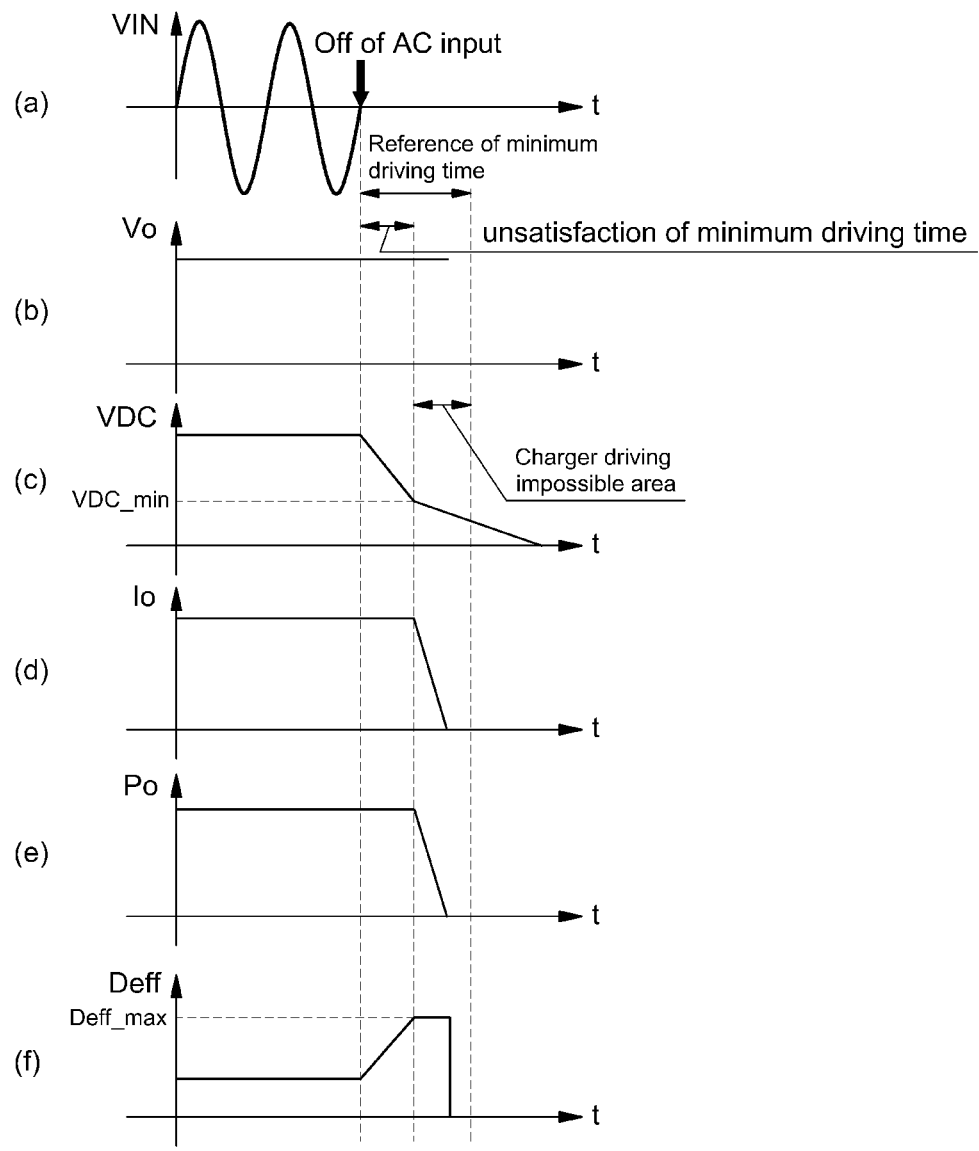
FIG. 2 is an exemplary graph illustrating states of factors (output voltage, output current, output power, and the like) related to driving of the charger when an instantaneous power failure of charger input power occurs in the battery charging system according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a battery charging system using a charger mounted within a vehicle and a driving control method of the charger thereof. Particularly, when the power supplied to the charger is cut off, the minimum driving time of the charger may be secured, thus improving stability and productivity. Accordingly, in the present invention, the driving time of an on board charger (OBC) may be increased by limiting the output current Io or output power Po of the charger according to the presence of generation of charger input voltage VIN (or on/off condition).

Figure 3:
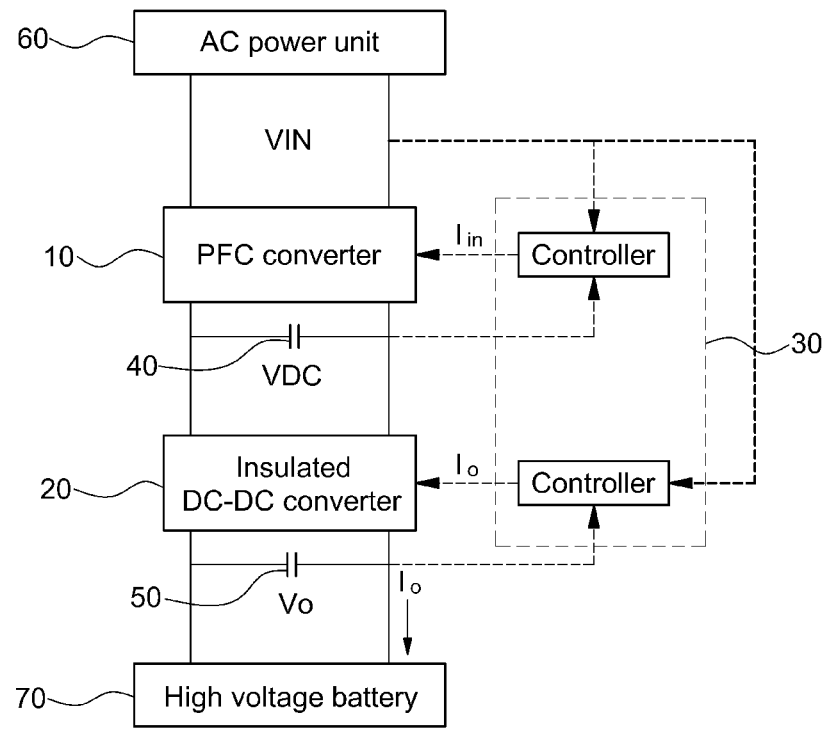
FIG. 3 is an exemplary configuration diagram illustrating a battery charging system using a charger according to an exemplary embodiment of the present invention.

As shown in FIG. 3, a battery charging system according to an exemplary embodiment of the present invention may be used to control the charging of a high voltage battery 70 within a vehicle, using an AC power unit 60 extraneous to the vehicle. The battery charging system may include a power factor corrector (PFC) converter 10 connectable to an output terminal of the AC power unit 60, a DC-DC converter 20, a controller 30, a first capacitor 40 and a second capacitor 50.

The AC power unit 60 is a power source extraneous to the vehicle, and may use, for example, a power source from within a home (e.g., a garage or the like). When being connected to an OBC, the AC power unit 60 may be configured to output charger input voltage VIN to an input terminal of the PFC converter 10. The PFC converter 10 may be connected to the output terminal of the AC power unit 60 to convert AC input voltage VIN input from the AC power unit 60 into DC voltage VDC and simultaneously compensate for the power factor of power. The DC-DC converter 20 may be connected between an output terminal of the PFC converter 10 and an input terminal of the high voltage battery 70. The DC-DC converter 20 may be configured to receive DC voltage VDC output from the PFC converter 10 and convert the received DC voltage VDC into a voltage for charging the high voltage battery 70. In particular, an insulated DC-DC converter using a full-bridge or half-bridge type switching circuit may be applied to the DC-DC converter 20.

The first capacitor 40 may be connected to the output terminal of the PFC converter 10 to smooth an output of the PFC converter 10, and the second capacitor 50 may be connected to an output of the DC-DC converter 20 to smooth an output of the DC-DC converter 20, input to the high voltage battery 70.

The controller 30 may be configured to operate the OBC. In particular, the controller 30 may be configured to determine the presence of generation of the charger input voltage VIN output from the AC power unit 60 and then determine output current Ioref or output power Poref of the DC-DC converter 20, based on the determination result, thereby adjusting the consumption amount of energy stored in the first capacitor 40. Further, the controller 30 may be connected to the input terminal of the PFC converter 10 to sense the charger input voltage VIN generated in the AC power unit 60, thereby determining the presence of generation of the charger input voltage VIN. Although not shown in this figure, the controller 30, for example, may be configured to determine the presence of generation of the charger input voltage VIN output from the AC power unit 60 using a sensor (not shown) connected to the input terminal of the PFC converter 10.

Figure 4:
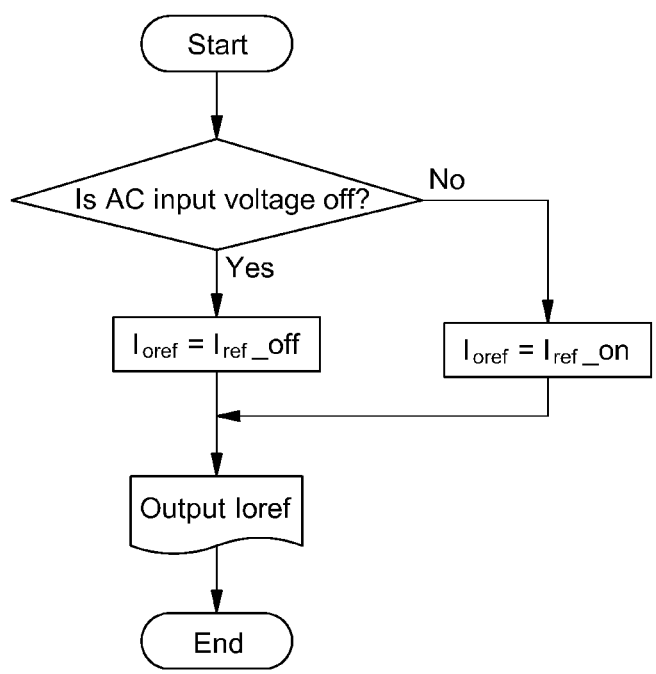
FIG. 4 is an exemplary flowchart schematically illustrating a driving control method of the charge of the battery charging system according to the exemplary embodiment of the present invention.

Referring to FIG. 4, in response to determining that the charger input voltage has been generated, (i.e., when the normal driving of the OBC is possible) the controller 30 may be configured to determine the output current Ioref of the DC-DC converter 20 as on current Iref_on so that the output current Io of the DC-DC converter 20 becomes the on current Iref_on. In response to determining that the charger input voltage VIN has not been generated, (i.e., when the driving of the OBC is impossible due to an instantaneous power failure) or the like, the controller 30 may be configured to determine the output current Ioref of the DC-DC converter 20 as a current less than the output current in the generation of the charger input voltage VIN.

Figure 5:
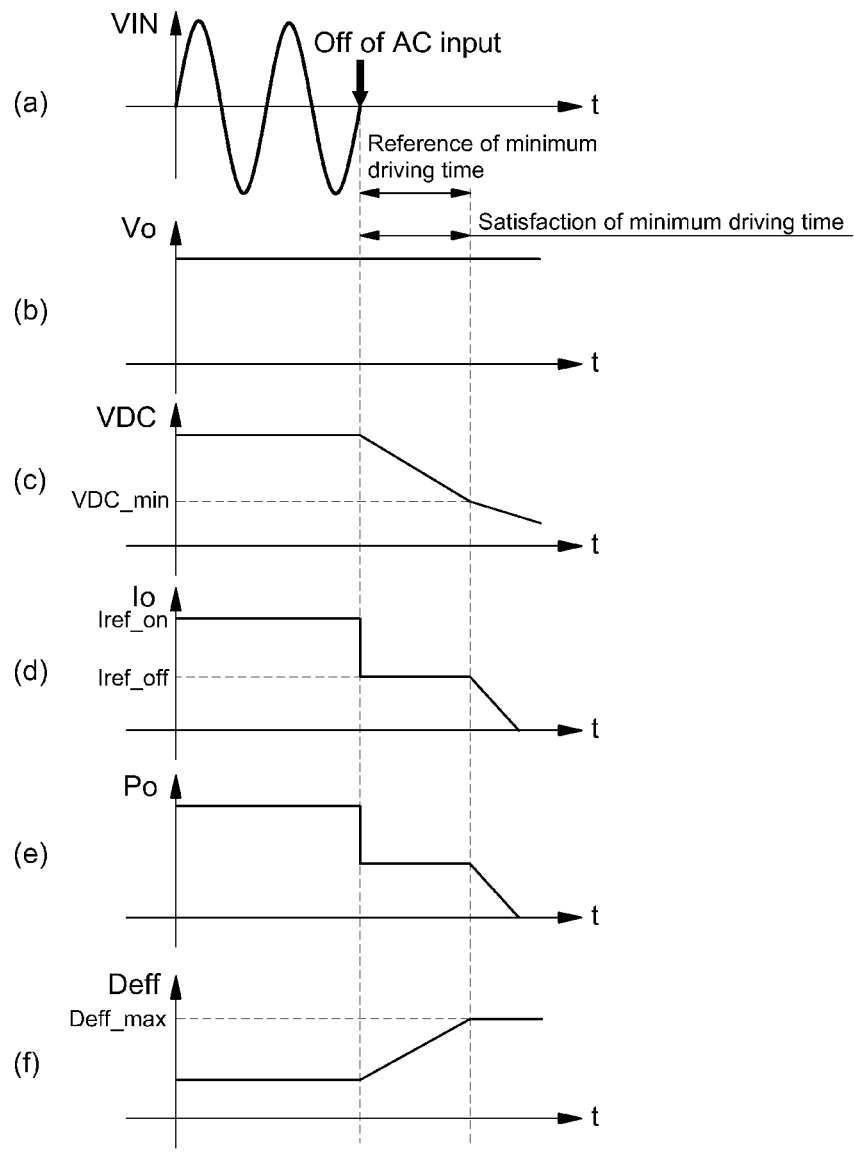
FIG. 5 is an exemplary graph illustrating states of factors (output voltage, output current, output power, and the like) related to driving of the charger when an instantaneous power failure occurs in the battery charging system according to the exemplary embodiment of the present invention.

Referring to FIGS. 4 and graph (d) in FIG. 5, the controller 30 may be configured to determine the output current Ioref provided to the DC-DC converter 20 when the charger input voltage VIN is not generated as off current Iref_off less than the on current Iref_on provided when the charger input voltage VIN is generated so that the output current Io of the DC-DC converter 20 becomes the off current Iref_off. In particular, the output current Io may be adjusted as the off current Iref_off during the minimum driving time of the charger (e.g., the minimum driving time for detecting and storing a driving state of the charger in an instantaneous power failure).

When the charger input voltage VIN is not generated, the PFC converter 10 may not provide power as an output due to loss of input, and hence the DC-DC converter 20 may be configured to use charging voltage of the first capacitor 40 as the input voltage. The controller 30 may be configured to maintain the charger output current Io as the off current Iref_off less than the on current Iref_on when the charger input voltage VIN is not generated, to minimize the decrement of the output voltage VDC (e.g., the amount of decrease in voltage per unit time) generated by discharging of the first capacitor 40, which may be significantly reduced compared to the related art. Accordingly, the time at which the output voltage VDC reaches the minimum voltage VDC_min (e.g., the minimum voltage required to generate the charger output voltage Vo) may be maximally delayed, thereby extending the charger driving time.

In particular, minimum current for the normal operation of the OBC, i.e., minimum current capable of maintaining the charger output voltage Vo to be about the same to that before the instantaneous power failure occurs (i.e., when the charger input voltage VIN is generated), and minimum current for maximally delaying the time at which the output voltage VDC of the first capacitor 40 reaches the minimum voltage VDC_min may be applied to the off current Iref_off.

Referring to FIG. 5, the controller 30 may be configured to decrease the output power Poref provided to the DC-DC converter 20 when the charger input voltage VIN is not generated to a power less than the output power when the charger input voltage VIN is generated. As a result, the controller 30 may be configured to limit the charger output current Io to the current less than the output current provided in the generation of the charger input voltage VIN, i.e., the off current Iref_off. Further, FIG. 5 is an exemplary graph illustrating states of factors related to driving of the OBC when a power failure of the charger input voltage VIN occurs. The (a) graph illustrates a state of AC input voltage VIN input to the PFC converter of the OBC. The (b) graph illustrates a state of charger output voltage Vo. The (c) graph illustrates a state of output voltage VDC of the PFC converter. The (d) graph illustrates a state of charger output current Io. The (e) graph illustrates a state of charger output power Po. Lastly, the (f) graph illustrates a state of effective duty Deff for controlling the output voltage of the DC-DC converter.

Moreover, in the present invention, the controller 30 may be configured to determine and adjust the output current Ioref or output power Poref of the DC-DC converter 20 according to the presence of generation of the charger input voltage VIN. Thus, during normal driving (e.g., without failure) where the charger input voltage VIN is generated, the OBC is operated normally (e.g., without failure), the charger output current Io may be maintained to a substantially constant value. During an instantaneous power failure or the like where the charger input voltage VIN is not generated, the charger output current Io may be limited to the minimum value (off current Iref_off), to decrease the voltage decrement (e.g., amount of decrease in voltage per unit time) of the first capacitor 40 generating the output voltage VDC. Accordingly, it may be possible to delay the time at which the output voltage VDC reaches the minimum voltage VDC_min As a result, it may be possible to increase the charger driving time and to secure the minimum driving time of the OBC.

Figure 6:
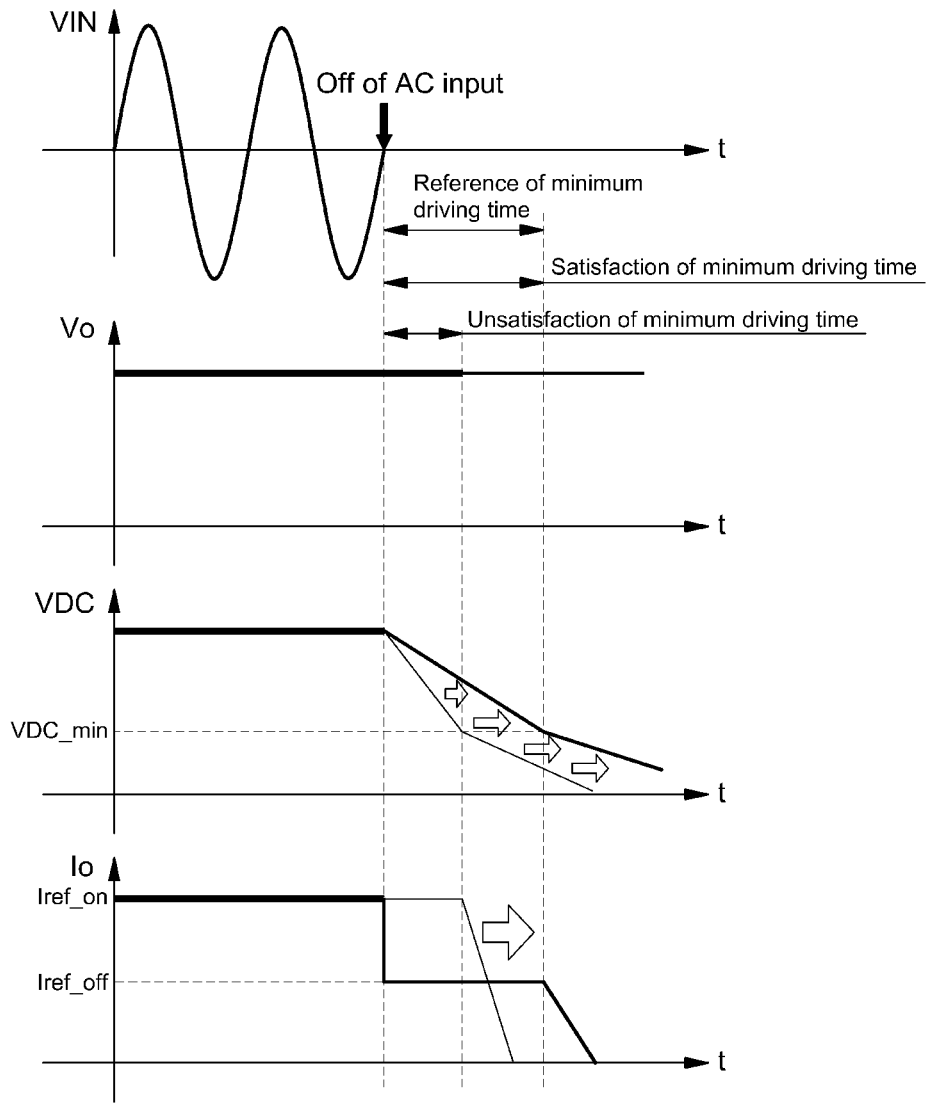
FIG. 6 is an exemplary graph comparing a time at which the output voltage VDC of a power factor corrector (PFC) converter reaches the minimum voltage VDC_min in driving control of the charger of the present invention with that of the related art.

When comparing the present invention with the related art with reference to FIG. 6, the driving time of the OBC according to the present invention shows to be increased. FIG. 6 is an exemplary graph comparing the states of the factors related to the driving of the OBC according to the present invention in a power failure of the charger input voltage VIN with those of the related art. The (a) graph illustrates states of AC input voltage VIN input to the PFC converter of the OBC. The (b) graph illustrates states of charger output voltage Vo. The (c) graph illustrates states of output voltage VDC of the PFC converter. Lastly, the (d) graph illustrates states of charger output current Io.

When an instantaneous power failure occurs, the charger input voltage VIN is off (i.e., is not generated), and hence the charging voltage of the first capacitor may be used. As shown in FIG. 6, in the related art, the charger output current Io is maintained identically to that before the power failure occurs (in normal driving) even in the off of the AC input voltage VIN, the battery charging is performed identically to that before the power failure occurs. Therefore, the charging voltage of the first capacitor 4 is suddenly decreased. As a result, the minimum driving time of the charger is unsatisfactory. On the other hand, as shown in FIG. 6, in the present invention, the controller 30 may be configured to determine the presence of on/off of the charger input voltage VIN and decrease the charger output current Io or decrease the charger output power Po to a constant value, to gently decrease the charging voltage of the first capacitor 40. As a result, the minimum driving time of the charger may be secured.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A battery charging system using a charger, comprising:
an on board charger (OBC) configured to include a power factor corrector (PFC) converter connectable to an output terminal of an alternating current (AC) power unit, and a direct current-direct current (DC-DC) converter connected between the PFC converter and a high voltage battery; and
a controller configured to determine the presence of generation of charger input voltage VIN output from the AC power unit and determine output current Ioref or output power Poref of the DC-DC converter, based on the determination of the presence of generation of charger input voltage VIN output,
wherein when the charger input voltage VIN is not generated, the controller is configured to determine the output current of the DC-DC converter as a current less than the output current in the generation of the charger input voltage VIN.

2. The battery charging system of claim 1, wherein, when the charger input voltage VIN is not generated, the controller is configured to limit the output power of the DC-DC converter to a power less than the output power in the generation of the charger input voltage VIN.

3. A driving control method of a charger of a battery charging system, which includes a power factor corrector (PFC) converter connectable to an output terminal of an alternating current (AC) power unit, and a direct current-direct current (DC-DC) converter connected between the PFC converter and a high voltage battery, the driving control method comprising:
a first process of determining, by a controller, the presence of generation of charger input voltage VIN output from the AC power unit; and
a second process of securing, by the controller, a minimum driving time of the charger by determining output current or output power of the DC-DC converter when the charger input voltage VIN is not generated as current or power decreased compared to when the charger input voltage VIN is generated, wherein, in the second process, the output current of the DC-DC converter is limited to a current less than the output current when the charger input voltage VIN is generated.

4. The driving control method of claim 3, wherein, in the second process, when the charger input voltage VIN is not generated, the output power of the DC-DC converter is limited to a power less than the output power in the generation of the charger input voltage VIN.

* * * * *